(12) United States Patent
Dunn

(10) Patent No.: US 10,388,232 B2
(45) Date of Patent: Aug. 20, 2019

(54) REDUNDANT BACKLIGHT FOR ELECTRONIC DISPLAY

(71) Applicant: William Dunn, Alpharetta, GA (US)

(72) Inventor: William Dunn, Alpharetta, GA (US)

(73) Assignee: AMERICAN PANEL CORPORATION, Alpharetta, GA (US)

( * ) Notice: Subject to any disclaimer, the term of this patent is extended or adjusted under 35 U.S.C. 154(b) by 0 days.

(21) Appl. No.: 16/257,620

(22) Filed: Jan. 25, 2019

(65) Prior Publication Data

US 2019/0189064 A1 Jun. 20, 2019

Related U.S. Application Data

(63) Continuation of application No. 13/159,183, filed on Jun. 13, 2011, now abandoned.

(60) Provisional application No. 61/353,986, filed on Jun. 11, 2010.

(51) Int. Cl.
| | |
|---|---|
| *G02F 1/13357* | (2006.01) |
| *H05B 37/02* | (2006.01) |
| *G09G 3/34* | (2006.01) |
| *G02F 1/1335* | (2006.01) |
| *F21V 8/00* | (2006.01) |

(52) U.S. Cl.
CPC ......... *G09G 3/3426* (2013.01); *G02B 6/0068* (2013.01); *G02B 6/0073* (2013.01); *G02F 1/133603* (2013.01); *G02B 6/0061* (2013.01); *G09G 2320/0233* (2013.01); *G09G 2320/0626* (2013.01); *G09G 2360/16* (2013.01)

(58) Field of Classification Search
CPC ............ G02F 1/133603; G09G 3/3406; G09G 2330/08
USPC ...................................... 345/102, 55, 38–39
See application file for complete search history.

(56) References Cited

U.S. PATENT DOCUMENTS

| | | | |
|---|---|---|---|
| 6,099,145 A | 8/2000 | Sendova et al. | |
| 7,012,382 B2 | 3/2006 | Cheang et al. | |
| 7,262,752 B2 | 8/2007 | Weindort | |
| 7,293,907 B2 | 11/2007 | Kim | |
| 7,465,079 B1 | 12/2008 | Cull | |
| 2005/0242742 A1 | 11/2005 | Cheang | |
| 2007/0188425 A1 | 8/2007 | Saccomanno | |
| 2008/0100561 A1 | 5/2008 | Price et al. | |
| 2009/0273764 A1 | 11/2009 | D'Alessio et al. | |
| 2010/0148697 A1 | 6/2010 | Bayat et al. | |
| 2011/0109228 A1 | 5/2011 | Shimomura et al. | |

*Primary Examiner* — Bryan Earles
(74) *Attorney, Agent, or Firm* — Standley Law Group LLP; Jeffrey S. Standley; Adam J. Smith

(57) ABSTRACT

A first and second plurality of lighting elements are each capable of producing a desired overall luminance output for a backlight at power level P. A respective controller is in communication with each of the plurality of lighting elements. At least one of the controllers is configured to determine a threshold luminance output, measure a measured luminance output, apply a non-zero power level less than P to the plurality of lighting elements, and, when the measured luminance output drops below the threshold luminance output, increase the power level applied to at least one of the plurality of lighting elements, up to as high as power level P, to return the measured luminance output to said threshold luminance output.

15 Claims, 5 Drawing Sheets

REDUNDANT BACKLIGHT FOR ELECTRONIC DISPLAY

CROSS-REFERENCE TO RELATED APPLICATIONS

This application is a continuation of U.S. application Ser. No. 13/159,183 filed Jun. 13, 2011, which claims the benefit of U.S. Provisional Application No. 61/353,986, filed Jun. 11, 2010, the disclosures of all of which are hereby incorporated by reference as if fully restated.

TECHNICAL FIELD

Disclosed embodiments relate generally to an LED backlight system for a liquid crystal display device.

BACKGROUND OF THE ART

Liquid Crystal Displays (LCDs) contain several layers which work in combination to create a viewable image. A backlight is used to generate the rays of light that pass through what is commonly referred to as the LCD stack, which typically contains several layers that perform either basic or enhanced functions. The most fundamental layer within the LCD stack is the liquid crystal material, which may be actively configured in response to an applied voltage in order to pass or block a certain amount of light which is originating from the backlight. The layer of liquid crystal material is divided into many small regions which are typically referred to as pixels. For full-color displays these pixels are further divided into independently-controllable regions of red, green and blue subpixels, where the red subpixel has a red color filter, blue subpixel has a blue color filter, and green subpixel has a green color filter.

The light which is passing through each subpixel typically originates as "white" (or broadband) light from the backlight, although in general this light is far from being uniform across the visible spectrum. The subpixel color filters allow each subpixel to transmit a certain amount of each color (red, green or blue). When viewed from a distance, the three subpixels appear as one composite pixel and by electrically controlling the amount of light which passes through each subpixel, the composite pixel can produce a very wide range of different colors due to the effective mixing of light from the red, green, and blue subpixels.

Currently, the common illumination source for LCD backlight assemblies or Back Light Unit (BLU) is fluorescent tubes, but the industry is moving toward light emitting diodes (LEDs). Environmental concerns, small space requirements, lower energy consumption, and long lifetime are some of the reasons that the LCD industry is beginning the widespread usage of LEDs for backlights.

LCDs are becoming popular for not only home entertainment purposes, but are now being used as informational/advertising displays in both indoor and outdoor locations. When used for information/advertising purposes, the displays may remain 'on' for extended periods of time and thus would see much more use than a traditional home theatre use. Further, when displays are used in areas where the ambient light level is fairly high (especially outdoors or in aircraft cockpits) the displays must be very bright in order to maintain adequate picture brightness. When used for extended periods of time and/or outdoors, durability of the components especially the illumination sources such as LEDs can become an issue.

As is readily apparent, an LCD will not function satisfactorily without an appropriate backlight system. The backlight is essential for proper functioning as the image or data displayed on the liquid crystal layer may only be viewed while the backlight is providing proper illumination to the liquid crystal stack. If the backlight system should fail completely or operate at a less than optimal level, then the LCD will not perform satisfactorily. While this may be a simple inconvenience when LCDs are used for entertainment purposes, when used for information or data displays this can be very costly. For example, LCDs are now being used in cockpits of aircraft as well as the instrument panels or display in ground vehicles and marine equipment. In these applications, when there is a failure of the backlight, the LCD may no longer display the important information for the vehicle/aircraft and controls may cease to operate. These situations can be undesirable not only to the passengers of the vehicle/aircraft, but also other soldiers who are counting on this part of the mission.

LEDs, however, have a limited life span, and eventually their luminance will degrade until little or no luminance is generated. Some LEDs may quickly fail simply due to a manufacturing defect or may fail due to shock/forces applied to the aircraft or ground vehicle. Currently when this occurs in an LED backlight, the entire backlight assembly must be manually replaced (i.e., the element which every LED is mounted to is replaced with a new element containing all new LEDs). This is expensive, and is often time consuming. Alternatively, the LED backlight assembly could be removed from the display housing, and the degraded or faulty LEDs could be manually replaced. This is typically even more costly, and involves extensive manual labor. In currently known units, this also requires virtual complete disassembly of the LCD to gain access to the backlight. This complete disassembly is not only labor intensive, but must be performed in a clean room environment and involves the handling of expensive, delicate, and fragile components that can be easily damaged or destroyed, even with the use of expensive specialized tools, equipment, fixtures, and facilities.

Thus, there exists a need for a more durable and dependable backlight for a LCD so that failures can be accounted for and vehicles/aircraft can complete a mission and/or return safely to base.

SUMMARY

Exemplary embodiments provide a light source for a display device having prominent color reproducibility. Exemplary embodiments also provide a light source for a display device enabling thin and compact display production continuously over extended use periods. In order to ensure color reproducibility and performance, the backlight of an electronic display should preferably perform satisfactorily at all times.

Exemplary embodiments provide a backlight system for an electronic display device, preferably an LCD device. The backlight system includes a first backlight apparatus and at least one additional backlight apparatus. The first backlight apparatus may be capable of providing sufficient light to operate the display. The second backlight apparatus may be operated in the event that a portion of the first backlight apparatus falls below predetermined operational standards.

In at least one embodiment, there may be a backlight apparatus including a first array of LEDs mounted on a printed circuit board (PCB). Additionally, there may be a second (redundant) set of LEDs mounted adjacent to the first array of LEDs. The redundant set of LEDs may be mounted on the same PCB as the first array of LEDs. Alternatively if using an edge-lit design, the first set of LEDs may be placed along a first edge of the backlight while a second set of LEDs may be placed along another edge of the backlight. A first control module may be associated with the first array of LEDs while the redundant LEDs may be controlled by a second control module. The two control modules may be in a master/slave arrangement where the first control module is the master while the second control module is the slave.

The system may include a device for monitoring the luminance produced by the first and/or second array of LEDs. The monitoring device may include predetermined operational standards for the display. When the monitoring device detects that the display has fallen below the predetermined standard for luminance, the monitoring system may send a signal to one or both control modules. If the first array of LEDs were the only source of illumination, the control modules can then switch to the second array of LEDs as there may have been a failure in the first array. The second or redundant set of LEDs can be utilized seamlessly, thus ensuring continuous operation of the LCD without the need for costly and time consuming repairs of the backlight system.

Alternatively, the first and second array of LEDs may be powered concurrently. Operating the LCD in this manner allows the two LED arrays to operate at ½ the wattage while supplying the same amount of illumination. This is noteworthy as LED efficiency (sometimes measured as lumens per watt) is inversely related to temperature and by powering each LED at a lower wattage less heat is generated and the LEDs function at higher efficiency. If one array were to fail, the other array could adequately illuminate the LCD.

DETAILED DESCRIPTION

Figure 1:
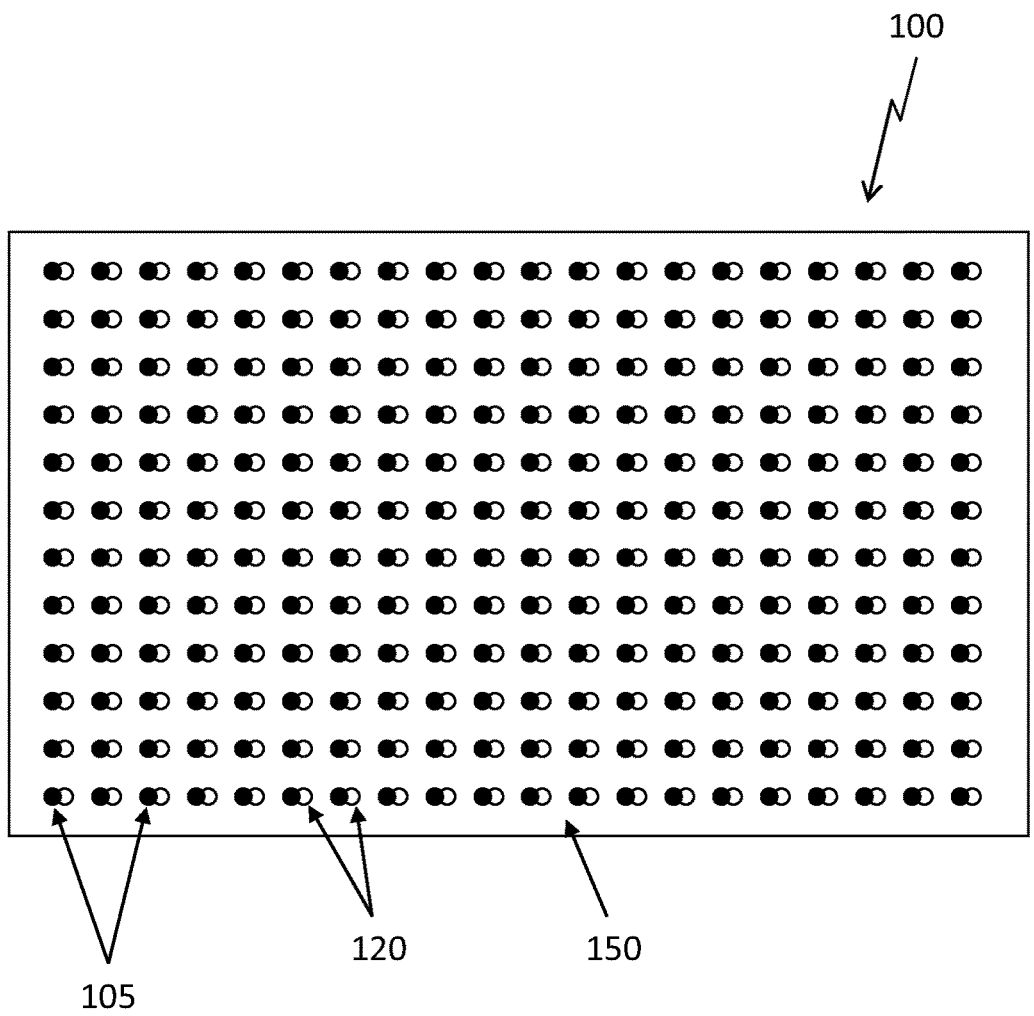
FIG. 1 shows a front view of an embodiment for direct LED backlighting an LCD.

FIG. 1 provides one embodiment showing a direct backlight assembly 100. A first plurality of LEDs 105 are mounted on a mounting substrate 150. The mounting substrate 150 could be any rigid or semi-rigid plate. An exemplary embodiment would use a printed circuit board (PCB) as the mounting substrate 150. A second (redundant) set of LEDs 120 are mounted adjacent to the first LEDs 105. The direct backlight assembly 100 preferably generates white light. As shown in this embodiment, white LEDs are used to create the white light. Therefore, in this embodiment, for every LED in the first set 105, there is a corresponding LED for the second set 120 placed adjacent thereto.

Of course, there are many methods for generating white light and any method could be used with the embodiments herein. Some embodiments may use several colored LEDs in combination to create the color white. Sometimes this is done with red, green, and blue LEDs used in combination. Other times this may be done with a pair of LEDs which contain a red-green and a red-blue LED that combine to create white.

In one embodiment, the first plurality of LEDs 105 remain on during normal operation while the second plurality of LEDs 120 are off. If the system detects a failure in the first plurality of LEDs 105, the second plurality of LEDs 120 may be turned on while the first plurality of LEDs 105 are now turned off. The changeover from the first to second set of LEDs can happen very quickly, so that there is no (or very minimal) interruption of the LCD operation when there is a failure in the first plurality of LEDs 105. This design has been found to provide many benefits. Notably, during operation of an aircraft or ground vehicle, a failure in the first plurality of LEDs 105 will not impact operation of the aircraft or vehicle where before this could cause catastrophic events including the loss of control of the aircraft or vehicle. Further, the lifetime of the backlight device is effectively doubled without having to manually repair or replace the backlight.

Figure 5:
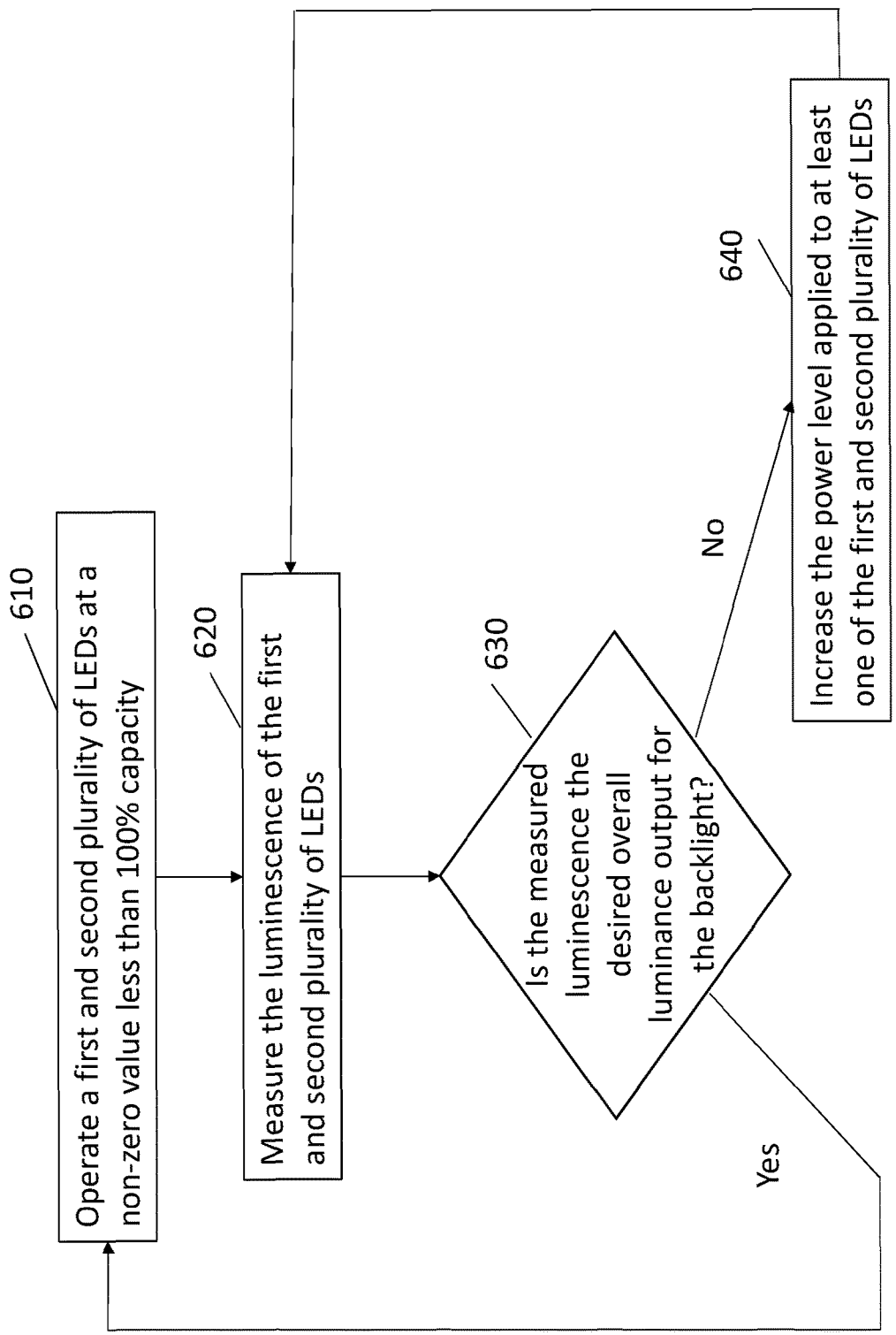
FIG. 5 shows exemplary logic for use with the devices of FIGS. 1-4.

As also illustrated in FIG. 5, in another embodiment, both sets of LEDs may be operated simultaneously. This may be referred to as a first mode and is shown in step 610. In this embodiment, each set of LEDs may be operated at only 50% capacity. This may be very desirable for LED operation as it can greatly increase the efficiency of the LED backlight and thus reduce the overall energy consumption of the device. Further, because the overall number of LEDs is effectively doubled, the light density has increased and a more uniform level of light may be produced. In the event that one of the sets of LEDs may fail, the unit can be operated sufficiently by only the remaining set of LEDs. In exemplary embodiments, the failure of one of the sets of LEDs may be detected by measuring the luminescence as shown in step 620 and determining that the measured luminescence falls below a desired output as shown in step 630. This changeover can also happen very quickly so that there would be no (or very minimal) interruption of the LCD operation. This may be referred to as a second mode as shown in step 640. Stated another way, the system may automatically switch between a first mode and a second mode. One set of the LEDs may be powerful enough to operate the LCD device at the desired brightness, color saturation, contrast, and any other optical parameters set for the LCD device operation. In other embodiments, one set of LEDs may be enough for the device to be viewable by the pilot or vehicle operator but may not be enough to operate at the desired levels for an extended period of time. In this type of embodiment, the remaining LEDs would allow the pilot or vehicle operator to complete the mission and/or return to base but the LCD device may need manually serviced before the next mission.

As an extension of this embodiment, three or four sets of LEDs could be used to construct the backlight. Here, during normal operation each set of LEDs could be driven at only ⅓ or ¼ of the normal capacity, resulting in high efficiency and light uniformity. Upon failure of any one set of LEDs, the remaining sets may be increased to provide the desired light levels. Again, this changeover can happen very quickly so that there would be no (or very minimal) interruption of the LCD operation.

Figure 2A:
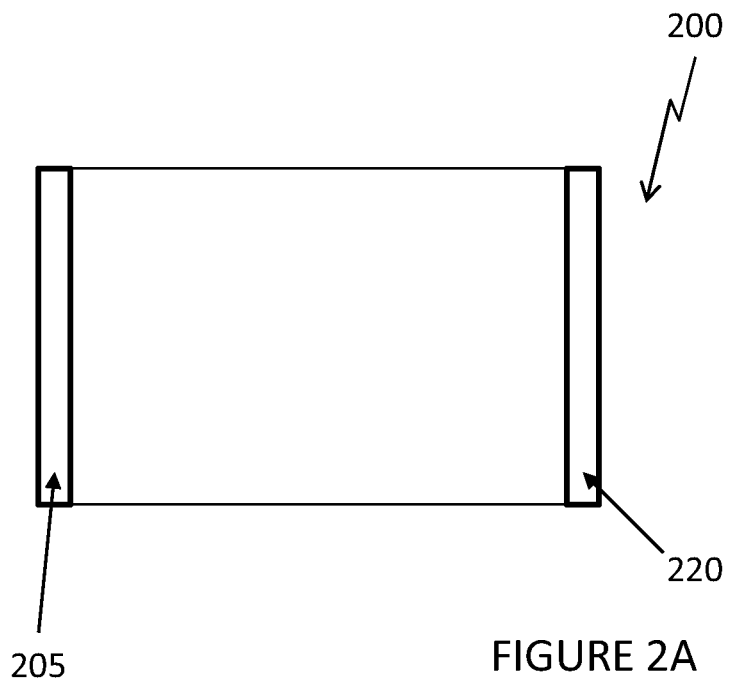
FIGS. 2A and 2B show front views for alternative embodiments of edge LED backlighting an LCD.

FIG. 2A shows an alternative embodiment using an edge-lit LED backlight 200. As known in the art, edge-lit LED backlights place the LEDs along one of the edges of the backlight so that they can provide illumination into the backlight cavity. This illumination is typically directed out of the backlight cavity and through the LCD stack as well as scattered and/or diffused to provide a uniform light distribution. The scattering and directing of the light can be accomplished in a number of different ways (light guides, diffusing sheets, etc.) and the details of this will not be discussed in detail as it is well known in the art. For the edge-lit embodiment 200, the first plurality of LEDs 205 are placed along a first edge while the second plurality of LEDs 220 are placed along the opposing edge of the backlight. This design is beneficial in an embodiment where both sets of LEDs are operated simultaneously as they could combine evenly to create a uniform distribution of light. Again, if the first set of LEDs 205 were to fail, the second set of LEDs 220 could provide enough illumination so that the LCD device could remain operational. The LCD device could be adequately powered to the desired operation parameters with the remaining set of LEDs or may simply be powered enough for the image on the LCD to be viewable so that the aircraft or vehicle could complete the mission and/or return to base.

Figure 2B:
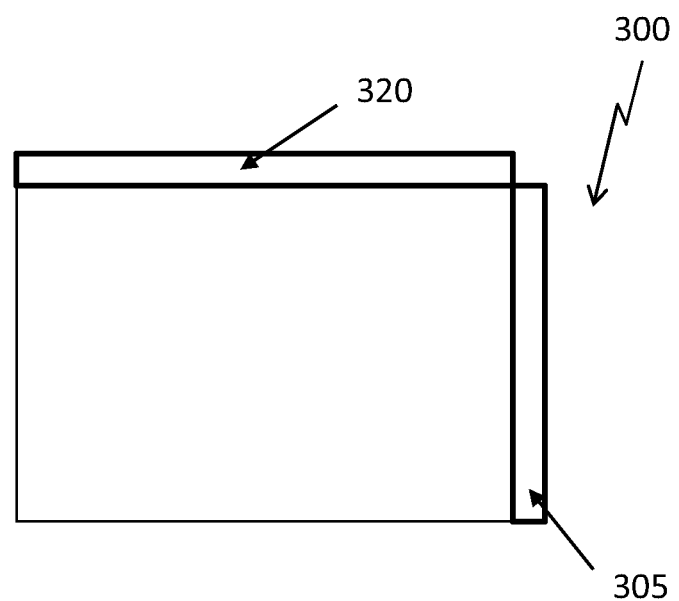

FIG. 2B provides another embodiment using an edge-lit LED backlight 300. Here, the first set of LEDs 305 is provided along the vertical edge while the second set of LEDs 320 is provided along the horizontal edge. Of course, there could be additional sets of LEDs provided along the bottom horizontal edge and the left vertical edge. In this type of arrangement, the additional LEDs could correspond with the first or second LEDs 305 and 320 or may be third and fourth sets of LEDs which are driven independently of the first and second sets of LEDs 305 and 320.

Figure 3A:
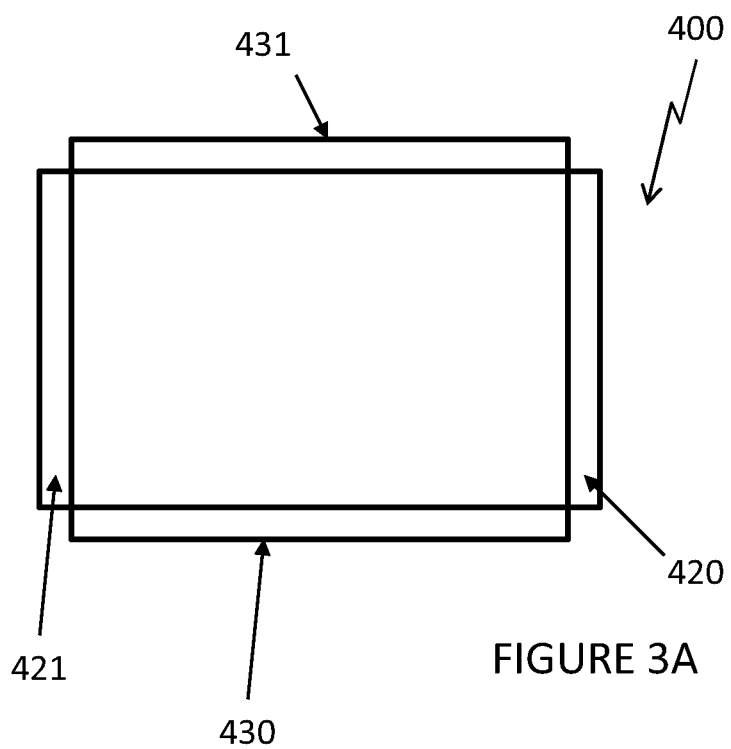
FIG. 3A shows a front view for an embodiment using edge LED backlighting an LCD where the both opposing sides of the LCD are illuminated.

FIG. 3A shows a front view for an embodiment 400 using edge LED backlighting for an LCD where the both opposing sides of the LCD are illuminated. Here, a first set of LEDs is comprised of two arrays of LEDs 431 and 430 which are placed on opposing sides of the LCD. Additionally, a second set of LEDs is comprised of two arrays of LEDs 420 and 421 which are placed on opposing sides of the LCD.

Figure 3B:
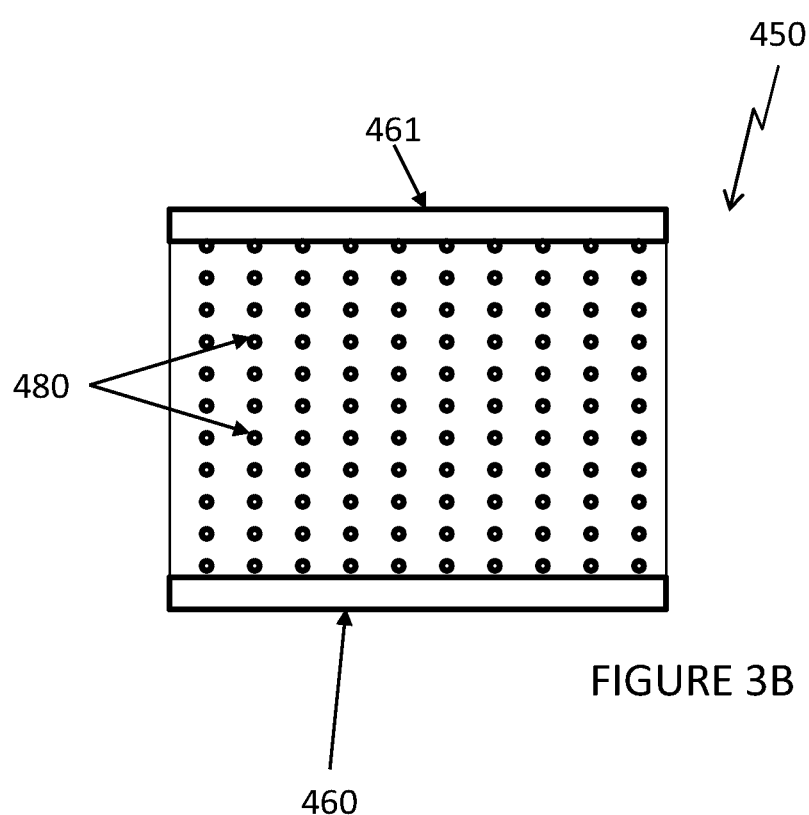
FIG. 3B shows a front view for an embodiment using a combination of edge LED backlighting and direct LED backlighting.

FIG. 3B shows a front view for an embodiment 450 using a combination of edge LED backlighting and direct LED backlighting. Here, a first set of LEDs may be provided in edge-lit fashion such that LEDs 461 are along a first edge with LEDs 460 along an opposing edge. Additionally, a second set of LEDs 480 is provided in a direct lit fashion.

Figure 4:
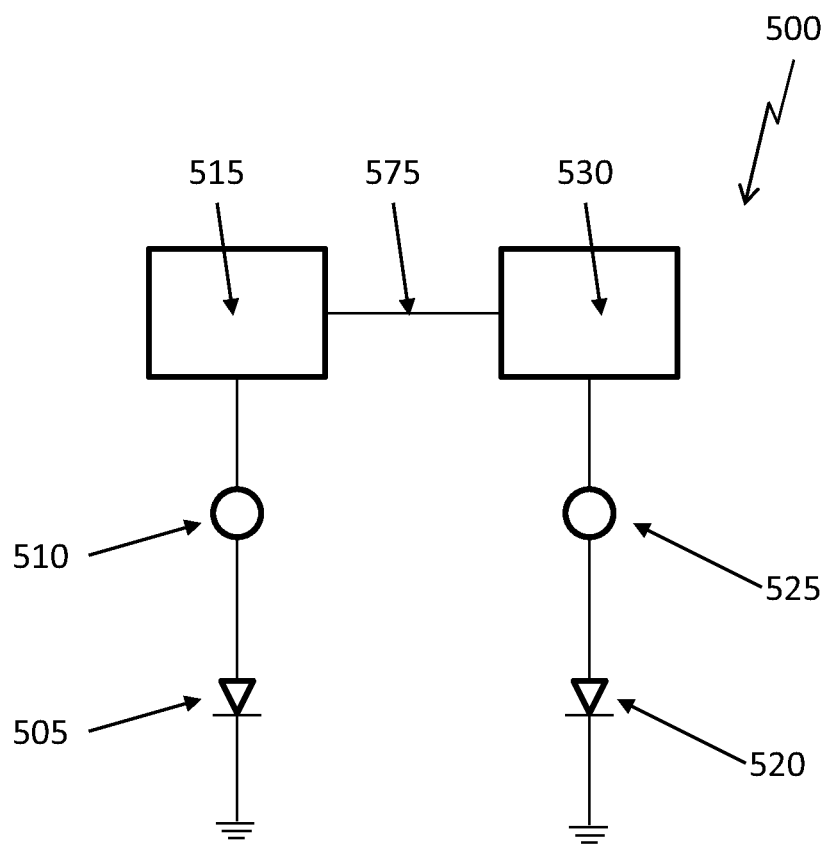
FIG. 4 shows an electrical schematic for an exemplary embodiment.

FIG. 4 provides an electrical schematic for an exemplary embodiment. A first controller 515 is in electrical communication with a first current source 510 which drives the first set of LEDs 505. A second controller 530 is in electrical communication with a second current source 525 which drives the second set of LEDs 520. The electrical connection 575 provides communication between the first controller 515 and second controller 530. The first and second controllers 515 and 530 may be any type of microprocessor, application-specific integrated circuit, complex programmable logic device, field-programmable gate array, or any other form of electrical control. In some embodiments, the first and second controllers 515 and 530 may be in a master/slave arrangement where the first controller 515 is the master and the second controller 530 is the slave. In this arrangement, the first controller 515 may provide adequate backlight luminance using just the first set of LEDs 505. In the event that the master controller (first controller 515) detects a failure in the first set of LEDs 505, it may direct the slave controller (second controller 530) to begin driving the backlight with the second set of LEDs 520. A failure could be detected by measuring the current draw of the LEDs and when the measured amount falls outside of an acceptable threshold then a failure may have occurred. A failure could also be detected by measuring the luminance of the LEDs and indicating a failure when the luminance levels fall below an acceptable amount.

Having shown and described preferred embodiments of the invention, those skilled in the art will realize that many variations and modifications may be made to affect the described embodiments and still be within the scope of the claimed invention. Additionally, many of the elements indicated above may be altered or replaced by different elements which will provide the same result and fall within the spirit of the exemplary embodiments. It is the intention, therefore, to limit the invention only as indicated by the scope of the claims.

What is claimed is:

1. A system for driving a redundant backlight at a desired overall luminance output comprising:
a first and second plurality of lighting elements positioned to illuminate an electronic display, wherein the first and second plurality of lighting elements are each capable of producing the desired overall luminance output for the backlight at full power;
a first controller in communication with the first plurality of lighting elements;
a second controller in communication with the second plurality of lighting elements; and
software instructions, which when executed, configure at least one of the first and second controllers to:
determine a threshold luminance output;
measure a measured luminance output;
operate the backlight in a first mode whereby the power level applied to each of the first plurality of lighting elements is substantially half power and the power level applied to each of the second plurality of lighting elements is substantially half power, until the measured luminance output drops below the threshold luminance output; and
automatically configure the backlight to operate in a second mode when the measured luminance output drops below the threshold luminance output, whereby in said second mode the power level applied to only one of said first plurality of lighting elements and said second plurality of lighting elements is increased sufficiently, up to as high as full power, to return the measured luminance output to at least said threshold luminance output, and no power is applied to the remaining plurality of lighting elements.

2. The system of claim 1 wherein:
said first plurality of lighting elements comprise light emitting diodes (LEDs);
said second plurality of lighting elements comprise LEDs; and
the electronic display is a liquid crystal type display.

3. The system of claim 1 wherein:
said first and second plurality of lighting elements are arranged to provide direct backlighting to the electronic display.

4. The system of claim 1 wherein:
said first and second plurality of lighting elements are arranged to provide edge lighting to the electronic display.

5. The system of claim 1 wherein:
the first plurality of lighting elements are positioned in a direct-lit arrangement and the second plurality of lighting elements are positioned in an edge-lit arrangement.

6. The system of claim 1 wherein:
the measured luminance output comprises data representing the current drawn by at least one of the first and second plurality of lighting elements.

7. The system of claim 1 wherein:
the measured luminance output comprises data representing the illuminance level provided by at least one of the first and second plurality of lighting elements.

8. The system of claim 1 wherein:
the first and second controllers are in a master/slave arrangement.

9. A system for driving a redundant backlight at a desired overall luminance output comprising:
a first plurality of lighting elements positioned to illuminate an electronic display and capable of producing the desired overall luminance output for the backlight at power level P;
a second plurality of lighting elements positioned to illuminate the electronic display, wherein said second plurality of lighting elements are capable of producing the desired overall luminance output for the backlight at power level P;
a first controller in communication with the first plurality of lighting elements;
a second controller in communication with the second plurality of lighting elements; and
software instructions, which when executed, configure at least one of the first and second controllers to:
determine a threshold luminance output;
measure a measured luminance output;
operate the backlight in a first mode whereby the power level applied to each of the first and second plurality of lighting elements is a non-zero value less than P; and
following detection of a failure in one of the first or second plurality of lighting elements, operate the backlight in a second mode whereby the power level applied to the remaining operable plurality of lighting elements is increased sufficiently, up to as high as said power level P, to return the measured luminance output to at least said threshold luminance output, and the failed plurality of lighting elements is turned off;
wherein the power level P is substantially full power;
wherein the non-zero value less than P is substantially one-half P;
wherein the non-zero value less than P applied to the first plurality of lighting elements is the same as the non-zero value less than P applied to the second plurality of lighting elements;
wherein said failure is detected when the measured luminance output drops below the threshold luminance output.

10. The system of claim 9 further comprising:
a first current source in electrical connection with the first controller and the first plurality of lighting elements; and
a second current source in electrical connection with the second controller and the second plurality of lighting elements.

11. The system of claim 10 wherein:
said failure is detected when the current draw from one of the first and second current sources drops to substantially zero.

12. The system of claim 8 wherein:
the first and second plurality of lighting elements are in an edge-lit arrangement.

13. The system of claim 8 wherein:
the first and second plurality of lighting elements are in a direct-lit arrangement.

14. The system of claim 8 wherein:
said first and second plurality of lighting elements are each comprised of light emitting diodes; and
the electronic display is a liquid crystal display.

15. A system for driving a redundant backlight for a liquid crystal display (LCD) at a desired overall luminance output comprising:
a LCD stack;
a backlight placed behind the LCD stack and comprising:
a first plurality of LEDs positioned in a direct-lit arrangement; and
a second plurality of LEDs positioned in an edge-lit arrangement;
wherein the first and second plurality of LEDs are each capable of producing a desired overall luminance output for the backlight when full power is applied to the respective plurality of LEDs;
a first controller in electrical communication with the first plurality of LEDs; and
a second controller in electrical communication with the second plurality of LEDs;
wherein the first and second controllers are configured to operate the backlight in a first mode whereby the power level applied to each of the first and second plurality of LEDs is substantially half power, until a time when a measured luminance output drops below a predetermined threshold luminance output;
wherein the first and second controllers are configured to automatically begin operating in a second mode when the measured luminance output drops below said predetermined threshold luminance output, whereby in said second mode the power level to only one of said first or second plurality of LEDs is increased sufficiently, up to as high as full power, to return the display to at least said predetermined threshold luminance output, and no power is supplied to the remaining plurality of LEDs.

* * * * *